United States Patent Office 3,409,411
Patented Nov. 5, 1968

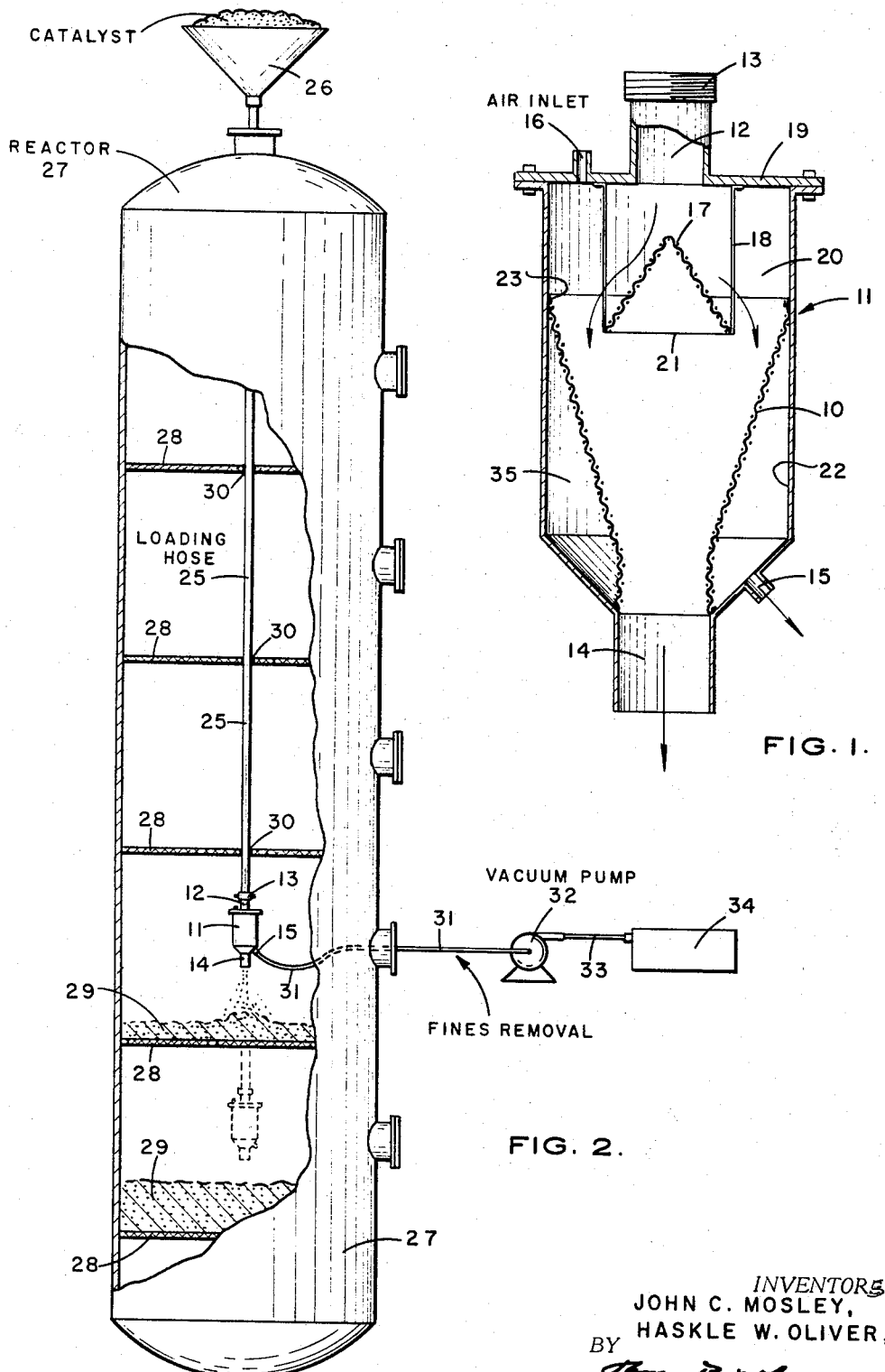

3,409,411
APPARATUS FOR SEPARATING SOLIDS AND
LOADING REACTOR VESSEL
John C. Mosley, Baytown, and Haskle W. Oliver, Highlands, Tex., assignors, by mesne assignments, to Esso Research and Engineering Company, Elizabeth, N.J., a corporation of Delaware
Filed July 26, 1965, Ser. No. 474,818
4 Claims. (Cl. 23—288)

ABSTRACT OF THE DISCLOSURE

A solids separation apparatus having a top feed inlet, a first perforate member directing feed particles in a diverging path, a second perforate member directing the particles in a converging path, air inlets and an air and fines outlet arranged for air to flow through the particles as they are divergingly and convergingly flowed towards a coarse particle outlet.

---

The present invention is directed to an apparatus for separating fines from solid particles. More particularly, the invention is concerned with removing fines from solid catalyst particles. In its more specific aspects, the invention is concerned with separating fines from catalyst particles while loading catalyst into a bed contained in a vessel.

The present invention may be briefly described as apparatus for separating fines from solid particles in which a vessel is provided having an inlet means in its upper end for introducing solid particles containing fines into said vessel and an outlet means in its lower end for withdrawing solid particles from the vessel substantially free of fines. Arranged in the vessel and spaced from the inlet means and the inner wall of said vessel is a conical screen member such that a first annulus is formed in the vessel, the conical screen member being arranged with the apex thereof pointing upwardly. A second conical screen member is arranged in the vessel and is preferably peripherally attached to the inner wall of the vessel by its base which surrounds the lower end of the first screen member. The second screen member forms a second annulus. An outlet member communicates with the second annulus for withdrawing fines from the vessel and an inlet member communicates with the first annulus for supplying a gasiform fluid to the vessel.

The invention is also directed to the separation of fines from solid particles containing same in which a stream of said solid particles is divergingly and convergingly flowed in a separation zone while flowing gasiform fluid in contact with the stream. Fines are removed from the stream with the gasiform fluid as the stream is being converged and thereafter a converged stream of solid particles substantially free of fines is recovered.

The solid particles are suitably particles of catalyst such as, but not limited to, supported or unsupported catalysts as illustrated by phosphoric acid on kieselguhr, supported cobal molybdate on alumina, platinum on alumina, and the like.

The solid particles may be in the form of pellets or extruded forms which may be either regularly or irregularly shaped. The particles may have a size ranging from $\frac{1}{16}''$ up to about $\frac{4}{16}''$ in diameter and may have lengths or other dimensions anywhere from 1 to 5 times the diameters. Thus, a pellet may be $\frac{1}{16}''$ by $\frac{3}{16}''$.

The size of the fines contained in the solid particles may range from less than 1 micron up to about 100 microns in size and may have the consistency of wheat flour and the like.

The amount of fines contained with the solid particles may range from about 0.01% up to as much as 5% of weight of the solid particles.

In the apparatus of the present invention, the perforated conical members may have perforations or openings ranging from less than $\frac{1}{64}$ of an inch up to about $\frac{3}{32}$ of an inch. Suitably wire mesh or screen may be used but the perforated conical member may have regular or irregular spaced openings which may be formed by other means. The openings may be sized with respect to the size of the fines.

The gasiform fluid employed may be any gasiform fluid such as air, nitrogen, argon, helium, gaseous or vaporous hydrocarbons, hydrogen, steam, and the like. The gasiform fluid may be inert or reactive to the solid particles. For example, if the solid particles are catalyst particles it may be desirable to use an inert gasiform fluid. It may also be desirable to use a reactive gasiform fluid such as hydrogen or an oxygen-containing gas if it is desired to react catalyst particles while fines are being removed therefrom.

The gasiform fluid employed will ordinarily be employed in an amount sufficient to suspend and remove the fines from the solid particles. An amount of gasiform fluid in the range from about 50 to about 500 cu. ft. gasiform fluid, such as air, per cu. ft. of solid particles, such as catalyst, may be used. For example, in removing fines from phosphoric acid catalyst particles about 100 to 150 cu. ft. of air per cu. ft. of phosphoric acid particles gives good results.

The present invention will be further described and illustrated with respect to the drawing in which:

FIGURE 1 is a sectional view of the apparatus of the present invention, and

FIGURE 2 is a sectional view showing the loading of a reactor vessel with catalyst particles in accordance with the present invention.

Referring now to the drawing, which illustrates a best mode and embodiment in which identical numerals will designate identical parts, and particularly to FIGURE 1, numeral 11 designates a vessel having an inlet 12 provided with a connecting or coupling means 13. Vessel 11 is provided with an outlet 14 and another outlet member 15. An inlet member 16 is also provided in the upper end of the vessel 11.

Spaced from the inlet 12 is a perforated conical member 17 which suitably is constructed of wire mesh supported by a plurality of brackets 18 depending from the closed upper end 19 of the vessel 11.

The member 17 forms an annulus 20 into which the inlet 16 connects. The lower end 21 of the member 17 is open and is surrounded by a second conical member 10 which is connected to the inner wall 22 of the vessel 11 at its base end 23 which is open upwardly. The member 10 is also constructed suitably of wire mesh. The member 10 is truncated and is connected to the outlet 14.

Referring now to FIGURE 2, the vessel 11 is connected by connecting means 13 to a loading hose 25 which in turn connects to a loading hopper 26 containing catalyst particles having a content of about 1% of fines. The vessel 11 and the hose 25 extend into a reactor vessel 27 provided with spaced apart supporting grids 28 onto which beds of catalyst 29 are being deposited. The loading hose 25 extends through openings or chimneys 30 in the grids 28.

As shown in FIGURE 2, a hose member such as 31 is connected to the outlet 15 and in turn connects to a pump 32 which discharges by a conduit 33 into a bag 34.

As the catalyst particles are loaded from hopper 26 through hose 25, the particles are discharged into vessel 11 and diverged onto the perforated member or screen 17 and then dropped into screen 10 and converged therein to be discharged through the outlet 14. By reducing the pressure in the annulus 35 between the screen 10 and the wall 22 with pump 32, air is drawn in through inlet 16 and also upwardly through outlet 14 into contact with and through the diverging stream flowing over the cone 17 and into contact with and through the converging stream flowing down in the cone 10. The fines are drawn with air through the perforations in screen 10 and outwardly from the annulus 35 through the pump 32 and collected and recovered in the bag 34.

The present invention is quite important and useful in that it eliminates filters downstream from catalytic operations which are required normally to prevent plugging of downstream equipment with catalyst fines. For example, heat exchangers downstream from a reactor such as 27 are no longer subject to plugging and operations may be conducted for extended lengths of time. Moreover, the invention is advantageous and useful in that it eliminates a health hazard to personnel due to dust in charging particles to a bed. For example, phosphoric acid when charged to a catalyst bed no longer creates a dust hazard.

In one operation, the reactors at a catalytic polymerization unit using pelletized phosphoric acid catalyst are charged with catalyst employing a series of five fixed beds. The catalyst is shipped from the manufacturer in 55 gallon steel drums. As received, these drums contain about 1% by weight of fines. These fines must be removed so that the fines will not be entrained in product streams and subsequently foul and plug heat exchangers. The present invention solves this problem by contacting the catalyst particles containing fines with a stream of air while flowing the catalyst particles divergingly and then convergingly just prior to depositing the catalyst particles in a reactor bed. Thus, a stream of catalyst particles containing fines is fed by gravity.

In accordance with the present invention, as the catalyst particles are treated they are diverged and converged employing opposed perforated conical elements with a stream of air being drawn through the moving layers of pellets which remove the fines.

While the present invention may be employed with any free flowing pelletized material to remove dust or fines, the invention is particularly adapted to removing fines from catalytic material. The device may be used in a vertical vessel containing perforated trays and may be suitably sized to pass through a manhole. Thus, when one bed has been deposited on a tray or grid, the apparatus of the present invention may be disconnected from the loading hose, removed from the manhole, the hose drawn upwardly and the cleaning device inserted on the next higher tray, connected to the loading hose and the cleaning and depositing operation resumed.

The present invention has been successfully used in charging reactor vessels in a phosphoric acid catalyzed polymerization unit in which olefins were charged. For example, it has been used in removing up to one drum of fines from a reactor charge of 155 drums of catalyst. After use of the present invention, the health hazard problem and the problem of fouling a heat exchanger downstream were eliminated. The present invention is therefore quite useful and advantageous.

The nature and objects of the present invention having been completely described and illustrated, and the best mode and embodiment thereof contemplated set forth, what we wish to claim as new and useful and secure by Letters Patent is:

1. Apparatus for charging solid particles and for separating fines from said solid particles which comprises:
   a first vessel arranged in a vertical position having at least one horizontal perforated plate intermediate its ends attached to the inner wall thereof;
   a second vessel arranged in a vertical position in said vertical vessel spaced above said perforated plate and having an inlet means in its upper end provided with conduit means communicating with means on the upper end of said first vessel for introducing solid particles containing fines into said second vessel and first outlet means in its lower end for introducing gasiform fluid into said second vessel and depositing solid particles substantially free from fines on said perforated plate;
   a first conical screen member arranged in said second vessel spaced from said inlet means and the inner wall of said second vessel to form a first annulus in said second vessel with the apex of said conical member pointing upwardly;
   a second conical screen member arranged in said second vessel having an open base surrounding the base of said first conical member, said open base being directly and peripherally attached to the inner wall of said second vessel and connecting to the first outlet means to form a second annulus in said vessel;
   a second outlet means adjacent the lower end of said second vessel extending to the exterior of said first vessel through a lateral opening therein communicating with said second annulus for discharging fines from said second vessel;
   pressure reduction means on the exterior of said first vessel connected to said second outlet means by a second conduit for removing said fines; and
   an inlet means adjacent the upper end of said second vessel communicating with said first annulus for supplying gasiform fluid to said second vessel from the interior of the first vessel.

2. Apparatus for separating fines from solid particles which comprises
   a vessel adapted to be arranged in a vertical position having an inlet means in its upper end for introducing solid particles containing fines into said vessel and a first outlet means in its lower end for introducing gasiform fluid into said vessel and withdrawing solid particles substantially free from fines;
   a first perforated conical member arranged in said vessel spaced from said inlet means and the inner wall of said vessel to form a first annulus in said vessel with the apex of said conical member pointing upwardly;
   a second perforated conical member arranged in said vessel having an open base surrounding the base of said first conical member, said open base being directly and peripherally attached to the inner wall of said vessel and connecting to the first outlet means to form a second annulus in said vessel;
   a second outlet means adjacent the lower end of said vessel for communicating with said second annulus for withdrawing fines from said vessel; and
   an inlet means adjacent the upper end of said vessel communicating with said first annulus for supplying gasiform fluid to said vessel.

3. Apparatus for separating fines from solid particles which comprises
   a vessel adapted to be arranged in a vertical position having an inlet means in its upper end for introducing a stream of solid particles containing fines into said vessel and a first outlet means in its lower end for introducing gasiform fluid into said vessel and withdrawing solid particles substantially free from fines;
   a perforated divergent stream member arranged in said vessel spaced from said inlet means and the inner wall of said vessel to form a first annulus in said vessel;
   a perforated convergent stream member arranged in said vessel surrounding the lower end of said divergent stream member, said open base being directly and peripherally attached to the inner wall of said vessel and connecting to the first outlet means to form a second annulus in said vessel;

an outlet means adjacent the lower end of said vessel communicating with said second annulus for withdrawing fines from said vessel; and an inlet means adjacent the upper end of said vessel communicating with said first annulus for supplying gasiform fluid to said vessel.

4. Apparatus for separating fines from solid particles which comprises a vessel adapted to be arranged in a vertical position having an inlet means in its upper end for introducing solid particles containing fines into said vessel and a first outlet means in its lower end for introducing gasiform fluid into said vessel and withdrawing solid particles substantially free from fines;

a first conical screen member arranged in said vessel spaced from said inlet means and the inner wall of said vessel to form a first annulus in said vessel with the apex of said conical member pointing upwardly;

a second conical screen member arranged in said vessel having an open base surrounding the base of said first conical member and peripherally attached directly to the inner wall of said vessel to form a second annulus in said vessel, said second conical member being truncated and attached to said first outlet means;

an outlet means adjacent the lower end of said vessel communicating with said second annulus for withdrawing fines from said vessel; and an inlet means adjacent the upper end of said vessel communicating with said first annulus for supplying gasiform fluid to said vessel.

References Cited

UNITED STATES PATENTS

| | | | |
|---|---|---|---|
| 744,390 | 11/1903 | Osborne | 209—281 X |
| 841,959 | 1/1907 | Gentrup | 209—281 X |
| 1,116,777 | 11/1914 | Williams | 209—144 |

FRANK W. LUTTER, *Primary Examiner.*